(12) United States Patent
Seong

(10) Patent No.: US 10,090,502 B2
(45) Date of Patent: Oct. 2, 2018

(54) SECONDARY BATTERY

(71) Applicant: SAMSUNG SDI CO., LTD., Yongin-si, Gyeonggi-do (KR)

(72) Inventor: Jaeil Seong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 73 days.

(21) Appl. No.: 14/818,222

(22) Filed: Aug. 4, 2015

(65) Prior Publication Data

US 2016/0043374 A1 Feb. 11, 2016

(30) Foreign Application Priority Data

Aug. 11, 2014 (KR) ........................ 10-2014-0103631

(51) Int. Cl.
| | |
|---|---|
| *H01M 2/18* | (2006.01) |
| *H01M 2/16* | (2006.01) |
| *H01M 2/02* | (2006.01) |
| *H01M 2/14* | (2006.01) |
| *H01M 10/02* | (2006.01) |

(Continued)

(52) U.S. Cl.
CPC ........... *H01M 2/18* (2013.01); *H01M 2/0202* (2013.01); *H01M 2/14* (2013.01); *H01M 2/1673* (2013.01); *H01M 2/1686* (2013.01); *H01M 10/02* (2013.01); *H01M 2/0217* (2013.01); *H01M 2/36* (2013.01); *H01M 2/362* (2013.01);

(Continued)

(58) Field of Classification Search
CPC ........ H01M 2/18; H01M 2/0202; H01M 2/14; H01M 2/1673; H01M 2/1686; H01M 10/02; H01M 2/0217; H01M 2/36; H01M 2/362; H01M 10/052; H01M 10/0587; H01M 2200/00

See application file for complete search history.

(56) References Cited

U.S. PATENT DOCUMENTS

| | | | |
|---|---|---|---|
| 6,080,507 A * | 6/2000 | Yu | ........................ B29C 55/065 156/163 |
| 6,207,316 B1 | 3/2001 | Pauling | |

(Continued)

FOREIGN PATENT DOCUMENTS

| | | |
|---|---|---|
| DE | 10 2012 109 032 A1 | 5/2014 |
| EP | 2 750 234 A1 | 7/2014 |

(Continued)

OTHER PUBLICATIONS

Machine translation of Yeo et al. (KR 20080015163 A).*

(Continued)

*Primary Examiner* — Stewart A Fraser
(74) *Attorney, Agent, or Firm* — Lewis Roca Rothgerber Christie LLP

(57) ABSTRACT

A secondary battery comprising an electrode assembly comprising a first electrode plate, a second electrode plate, and a separator between the first electrode plate and the second electrode plate, a protection film coupled to one end of the electrode assembly, a can accommodating the electrode assembly, and a cap plate coupled to the can, wherein the separator protrudes more toward the protection film than the first electrode plate and the second electrode plate at the one end of the electrode assembly, and wherein the protection film is thermally bonded to an end portion of the separator.

19 Claims, 4 Drawing Sheets

(51) Int. Cl.
*H01M 10/052* (2010.01)
*H01M 2/36* (2006.01)
*H01M 10/0587* (2010.01)

(52) U.S. Cl.
CPC ...... *H01M 10/052* (2013.01); *H01M 10/0587* (2013.01); *H01M 2200/00* (2013.01)

(56) References Cited

U.S. PATENT DOCUMENTS

| | | | |
|---|---|---|---|
| 2006/0057459 A1* | 3/2006 | Kwon | H01M 2/06 429/174 |
| 2006/0154138 A1 | 7/2006 | Miyamoto et al. | |
| 2007/0154804 A1* | 7/2007 | Kim | H01M 2/0202 429/185 |
| 2008/0233474 A1 | 9/2008 | Son et al. | |
| 2011/0287302 A1* | 11/2011 | Kim | H01M 2/022 429/163 |
| 2012/0189884 A1* | 7/2012 | Guen | H01M 2/0473 429/82 |
| 2013/0054061 A1* | 2/2013 | Nishimoto | H01M 2/1653 701/22 |
| 2013/0143107 A1* | 6/2013 | Kuramoto | H01M 2/0287 429/163 |
| 2013/0224557 A1* | 8/2013 | Hayakawa | H01M 2/162 429/144 |
| 2015/0171393 A1* | 6/2015 | Ogata | H01M 2/14 429/246 |
| 2015/0270530 A1 | 9/2015 | Thoennessen et al. | |

FOREIGN PATENT DOCUMENTS

| | | | |
|---|---|---|---|
| JP | 2008-171583 | | 7/2008 |
| KR | 10-2006-0019768 A | | 3/2006 |
| KR | 10-2006-0059687 A | | 6/2006 |
| KR | 20060059698 A | * | 6/2006 |
| KR | 2008/0015163 A | | 2/2008 |
| WO | WO-2014014118 A1 | * | 1/2014 ............. H01M 2/14 |

OTHER PUBLICATIONS

EPO Search Report dated Jan. 20, 2016, for corresponding European Patent application 15180331.9, (11 pages).
EPO Search Report dated Sep. 18, 2015, for corresponding European Patent application 15180331.9, (7 pages).
English machine translation of Japanese Publication 2008-171583 dated Jul. 24, 2008, (23 pages).

* cited by examiner

SECONDARY BATTERY

CROSS-REFERENCE TO RELATED APPLICATION

This application claims priority to and the benefit of Korean Patent Application No. 10-2014-0103631, filed on Aug. 11, 2014, in the Korean Intellectual Property Office, the disclosure of which is incorporated herein in its entirety by reference.

BACKGROUND

1. Field

One or more embodiments of the present invention relate to a secondary battery.

2. Description of the Related Art

Secondary batteries, which, unlike non-chargeable primary cells, are chargeable and dischargeable batteries, are applied to various technical fields over many suitable industries. For example, secondary batteries are being noted not only as an energy source for mobile electronic devices such as digital cameras, cellular phones, and notebook computers but also as the energy source for electric vehicles which are suggested as an alternative to solve the problem of air pollution caused by existing gasoline and diesel internal combustion engines. As the number and expanse of areas where secondary batteries are used increases, secondary batteries with higher output, higher capacity, and better stability become more desirable.

SUMMARY

Aspects of embodiments of the present invention are directed toward a secondary battery having improved stability.

Additional aspects will be set forth in part in the description that follows and, in part, will be apparent from the description, or may be learned by practice of the presented embodiments.

Aspects of one or more embodiments of the present invention are directed toward a secondary battery comprising: an electrode assembly comprising a first electrode plate, a second electrode plate, and a separator between the first electrode plate and the second electrode plate; a protection film coupled to one end of the electrode assembly; a can accommodating the electrode assembly; and a cap plate coupled to the can, wherein the separator protrudes more toward the protection film than the first electrode plate and the second electrode plate at the one end of the electrode assembly, and wherein the protection film is thermally bonded to an end portion of the separator.

In an embodiment, the protection film comprises a first layer thermally bonded to the end portion of the separator, and a second layer stacked on the first layer, and wherein the first layer and the second layer comprise different material from each other.

In an embodiment, a melting point of the first layer is lower than that of the separator, and that of the second layer.

In an embodiment, the first layer comprises an ethylene-alpha olefin copolymer and/or a propylene-alpha olefin copolymer.

In an embodiment, a thickness of the first layer ranges from about 1 μm to about 50 μm.

In an embodiment, the second layer comprises polypropylene.

In an embodiment, a thickness of the second layer ranges from about 1 μm to about 100 μm.

In an embodiment, the protection film has a plurality of openings.

In an embodiment, the first electrode plate and the second electrode plate are separated from the protection film.

In an embodiment, the protection film is coupled to a portion of a side of the electrode assembly.

Aspects of one or more embodiments of the present invention are directed toward a secondary battery comprising: an electrode assembly in a jelly-roll shape and comprising a first electrode plate, a second electrode plate, and a separator between and rolled together with the first electrode plate and the second electrode plate; and a protection film coupled to a lower surface of the electrode assembly, wherein the separator protrudes more toward the protection film than the first electrode plate and the second electrode plate at the lower surface of the electrode assembly, wherein the protection film comprises a first layer thermally bonded to an end portion of the separator and a second layer, the second layer being stacked on the first layer, and wherein the first electrode plate and the second electrode plate are separated from the protection film.

In an embodiment, the first layer and the second layer comprise different material from each other, and wherein a melting point of the first layer is lower than that of the separator and that of the second layer.

In an embodiment, the melting point of the first layer ranges from about 60° C. to about 100° C.

In an embodiment, the first layer comprises an ethylene-alpha olefin copolymer and/or a propylene-alpha olefin copolymer.

In an embodiment, a thickness of the first layer ranges from about 1 μm to about 50 μm.

In an embodiment, the second layer comprises polypropylene.

In an embodiment, a thickness of the second layer ranges from about 1 μm to about 100 μm.

In an embodiment, the protection film has a plurality of openings, and each of the openings is equal to or less than 30 μm, in size.

In an embodiment, the protection film is coupled to a portion of a side of the electrode assembly.

In an embodiment, the secondary battery further comprises a can accommodating the electrode assembly and a cap plate coupled to the can.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
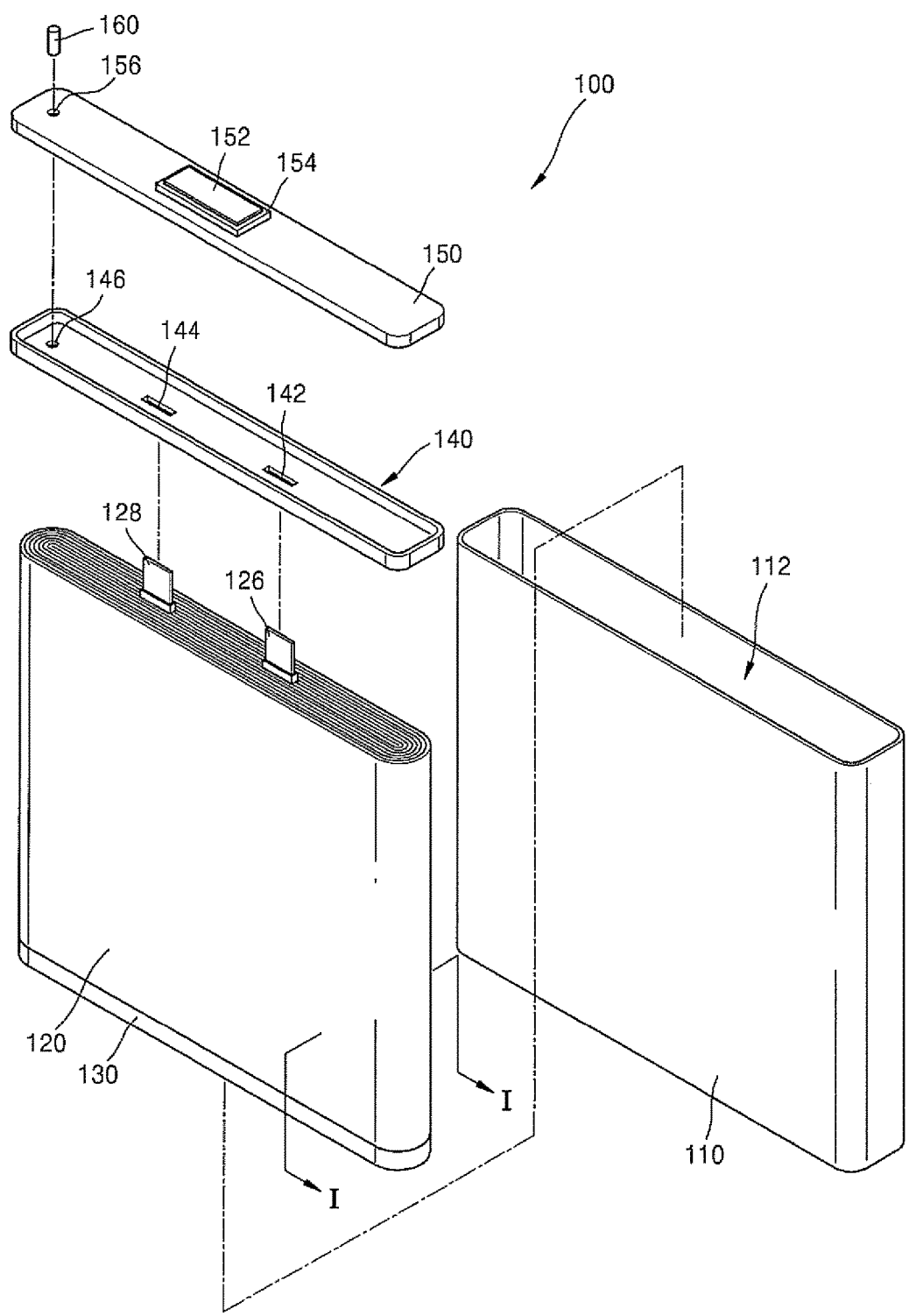
FIG. 1 is an exploded perspective view that schematically illustrates a secondary battery, according to an example embodiment of the present invention.

As the invention allows for various changes and numerous embodiments, example embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of the related art may not be provided when it is deemed that they may unnecessarily obscure the essence of the invention.

While such terms as "first" and "second" may be used to describe various components, such components must not be limited to the above terms. The above terms are used only to distinguish one component from another.

Expressions such as "at least one of," when preceding a list of elements, modify the entire list of elements and do not modify the individual elements of the list.

The terms used in the present specification are merely used to describe example embodiments and are not intended to limit the present invention. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. When a first element is described as being "coupled" or "connected" to a second element, the first element may be directly "coupled" or "connected" to the second element, or one or more other intervening elements may be located between the first element and the second element.

Hereinafter, the present invention will be described with reference to the example embodiments illustrated in the accompanying drawings.

Figure 2:
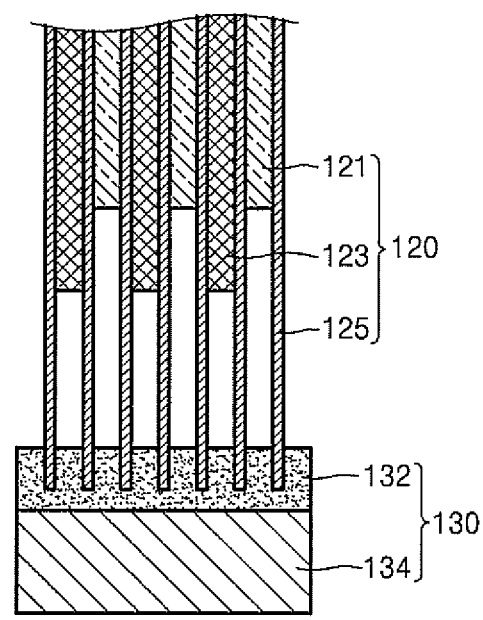
FIG. 2 is a cross-sectional view that schematically illustrates an I-I cross-section of FIG. 1, according to an example embodiment of the present invention.
Figure 3:
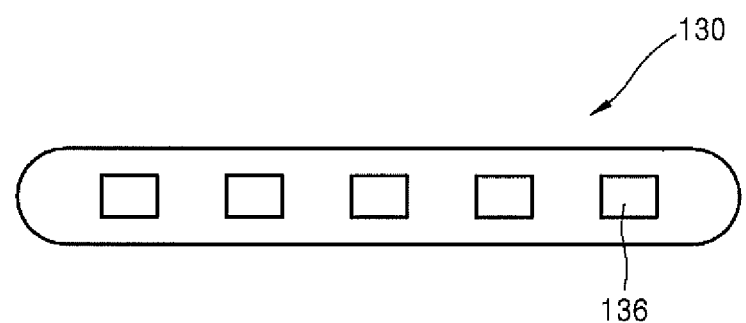
FIG. 3 is a plan view that schematically illustrates a protection film of the secondary battery of FIG. 1, according to an example embodiment of the present invention.
Figure 4:
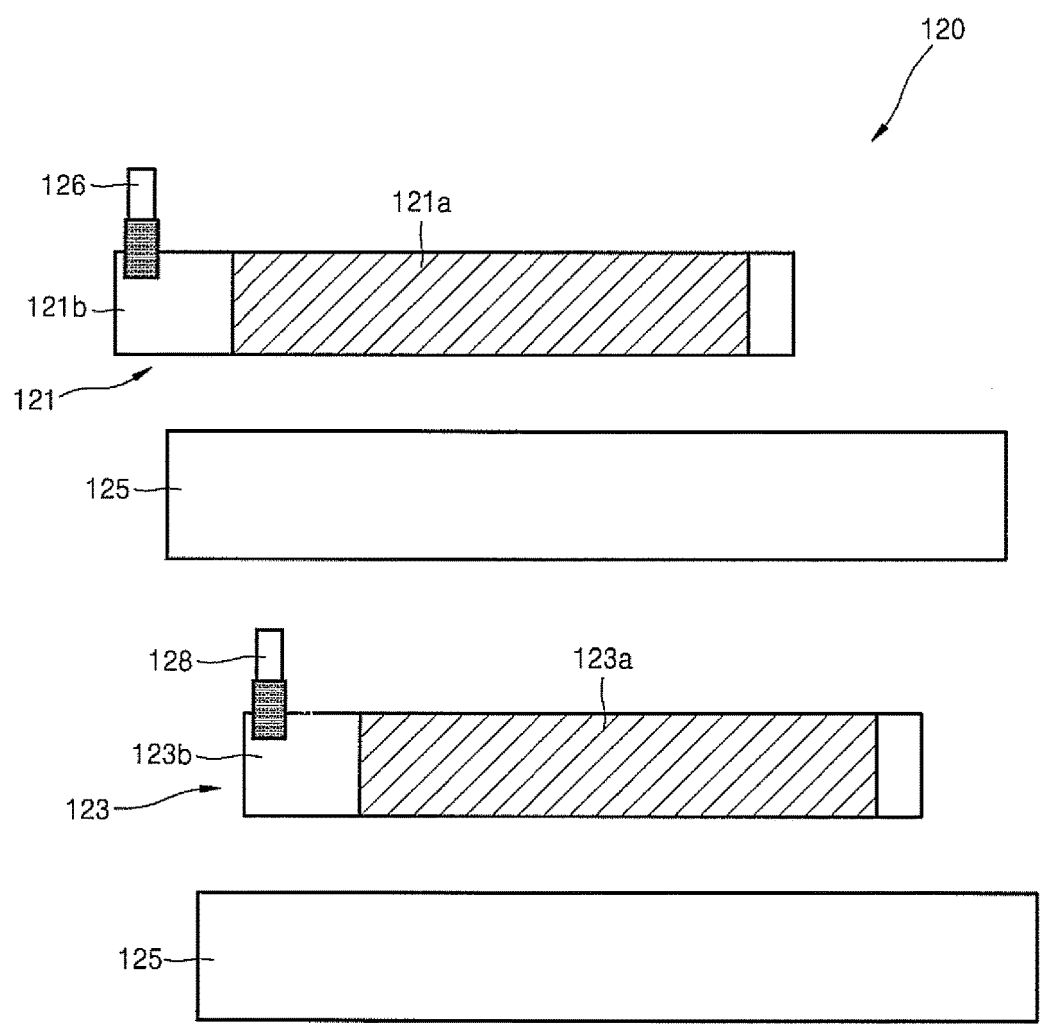
FIG. 4 is a schematic view of an electrode assembly of the secondary battery of FIG. 1, according to an example embodiment of the present invention.

FIG. 1 is an exploded perspective view that schematically illustrates a secondary battery according to an embodiment of the present invention. FIG. 2 is a cross-sectional view that schematically illustrates an I-I cross-section of FIG. 1, according to an example embodiment of the present invention. FIG. 3 is a plan view that schematically illustrates a protection film of the secondary battery of FIG. 1, according to an example embodiment of the present invention. FIG. 4 is a schematic view of an electrode assembly of the secondary battery of FIG. 1, according to an example embodiment of the present invention.

Referring to FIGS. 1 through 4, a secondary battery 100, according to an embodiment of the present invention, may include an electrode assembly 120, a protection film 130 coupled to (e.g., attached to or stuck to) one end of the electrode assembly 120, a can 110 that accommodates the electrode assembly 120, and a cap plate 150 that is coupled to the can 110.

The electrode assembly 120 may include first electrode plates 121, second electrode plates 123, and separators 125 between the first electrode plates 121 and the second electrode plates 123. For example, the electrode assembly 120 may be manufactured in a jelly-roll form by stacking the first electrode plates 121, the separators 125, and the second electrode plates 123 and rolling together the first electrode plates 121, the separators 125, and the second electrode plates 123, which are stacked.

The first electrode plates 121 may be either positive electrode plates or negative electrode plates. When the first electrode plates 121 are positive electrode plates, the second electrode plates 123 may be negative electrode plates. On the contrary, when the first electrode plates 121 are negative electrode plates, the second electrode plates 123 may be positive electrode plates. That is, the first electrode plates 121 and the second electrode plates 123 are formed such that their polarity is electrically different, and are not limited to particular polarities. However, hereinafter, an example in which the first electrode plates 121 are formed as positive electrode plates and the second electrode plates 123 are formed as negative electrode plates will be described for convenience of explanation.

The first electrode plate 121 may include a first active material portion 121a on which a first active material is coated and a first uncoated portion 121b on which the first active material is not coated. The first active material portion 121a, for example, may be formed by coating the first active material on a portion of at least one of any sides of an aluminum plate, and the rest of the aluminum plate on which the first active material is not coated may be the first uncoated portion 121b.

The first active material may be a positive active material such as a lithium transition metal oxide like $LiCoO_2$, $LiNiO_2$, $LiMnO_2$, and $LiMnO_4$ or a lithium chalcogenide.

A first electrode tab 126 may be electrically coupled to (e.g., electrically connected to) the first electrode plate 121. The first electrode tab 126 has one end, which may be attached to the first uncoated portion 121b by welding and the like, and has another end, which may be attached to the cap plate 150 by welding and the like.

The second electrode plate 123 may include a second active material portion 123a on which a second active material is coated, and a second uncoated portion 123b on which the second active material is not coated. The second active material portion 123a, for example, may be formed by coating the second active material on a portion of at least one of any sides of a copper plate, and the rest of the copper plate on which the second active material is not coated may be the second uncoated portion 123b.

The second active material, for example, may be a negative active material, specifically a carbon material (such as crystalline carbon, amorphous carbon, a carbon composite, or a carbon fiber), a lithium metal, a lithium alloy, and/or the like.

A second electrode tab 128 may be electrically coupled to (e.g., electrically connected to) the second electrode plate 123. The second electrode tab 128 has one end, which may be attached to the second uncoated portion 123b by welding and the like, and has another end, which may be attached to an electrode terminal 152 by welding and the like.

The separators 125 may include porous polymer membranes, which are formed to include at least one selected from polyethylene (PE), polystyrene (PS), and polypropylene (PP). For example, the separators 125 may be manufactured by coating a poly(vinylidene fluoride-hexafluoropropylene) (PVDF-HFP) copolymer on any one base selected from the group consisting of PE, PS, PP, and a PP-PE copolymer. However, the manufacturing of the separators 125 is not limited thereto. The separators 125 may be formed with a larger area than the first electrode plate 121 and the second electrode plate 123 to prevent a short circuit between the first electrode plate 121 and the second electrode plate 123.

The can 110 includes an opening portion 112 at one side thereof in which the electrode assembly 120 may be inserted. The opening portion 112 of the can 110 may be sealed by the cap plate 150 after the electrode assembly 120 is accommodated in the can 110. Meanwhile, an insulation plate 140 may be located between the cap plate 150 and the electrode assembly 120.

The can 110 is formed with a conductive member such as aluminum and thus protects the electrode assembly 120 from external shock and may perform a function of a heat sink, which radiates heat produced by (e.g., involved in) the charging and discharging operations of the electrode assembly 120 to the outside.

The insulation plate 140 prevents up-and-down motions of the electrode assembly 120 and may include a first slit 142, which the first electrode tab 126 may pass through, and a second slit 144, which the second electrode tab 128 may pass through. Also, the insulation plate 140 may have an opening (e.g., a hole) 146 for injection of an electrolyte formed at a point that is separated from the first slit 142 and the second slit 144.

The cap plate 150 may be formed with the same material as the can 110 and may seal the opening portion 112 by being coupled to the can 110 by welding and the like. The cap plate 150 may include an electrolyte inlet 156 at one side thereof. After the cap plate 150 is coupled to the can 110, the electrolyte is injected into the can 110 through the electrolyte inlet 156, and the electrolyte inlet 156 may be sealed by a cap 160.

The first electrode tab 126 may be attached to the cap plate 150 by welding and/or the like. Also, the electrode terminal 152, which coupled to (e.g., connects to or contacts) the second electrode tab 128, is formed on the cap plate 150, and an insulator 154 may be located between the electrode terminal 152 and the cap plate 150 to prevent a short circuit between the electrode terminal 152 and the cap plate 150.

Meanwhile, the can 110 is electrically coupled to (e.g., electrically connected with) the cap plate 150, and the cap plate 150 is electrically coupled to the first electrode tab 126, and therefore, the can 110 may have the same polarity as the first electrode plate 121. Here, an incident may occur, whereby the electrode assembly 120 rolled in the jelly-roll form, which is held in the can 110, may have a central portion that is adjacent to a shaft of the roll pushed in a direction of gravity, thereby causing a short circuit between the second electrode plate 123 and the can 110, which has the same polarity as the first electrode plate 121.

To prevent this, the protection film 130 may be coupled to (e.g., attached to or stuck to) the one end of the electrode assembly 120. Here, the one end of the electrode assembly 120 refers to a lower surface of the electrode assembly 120, which is adjacent to a bottom surface of the can 110.

Meanwhile, the separators 125 are formed with the larger area than the first electrode plates 121 and the second electrode plates 123 as described above, and therefore the separators 125 may protrude more toward the protection film 130 than the first electrode plates 121 and the second electrode plates 123 at the lower surface of the electrode assembly 120. Accordingly, the protection film 130 may be attached to an end portion of the separators 125, and the attachment between the protection film 130 and the separators 125 may be made by thermal bonding. Also, the first electrode plates 121 and the second electrode plates 123 are separated from the protection film 130, which may prevent or protect the first electrode plates 121 and the second electrode plates 123 from being damaged by heat in the thermal bonding.

Specifically, the protection film 130 may include a first layer 132, which is thermally bonded to the end portion of the separators 125, and a second layer 134, which is stacked on the first layer 132 and formed with a different material from the first layer 132.

The first layer 132 is thermally bonded to the end portion of the separators 125 as the first layer 132 is melted by heat applied to the protection film 130, in which a melting point of the first layer 132 may be lower than that of the separators 125.

For example, the melting point of the first layer 132 may range from about 60° C. to about 100° C. When the melting point of the first layer 132 is lower than 60° C., the first layer 132 may be melted by heat that is generated in operations of the secondary battery 100, and therefore stability of the secondary battery 100 may deteriorate. On the contrary, when the melting point of the first layer 132 is higher than 100° C., the separators 125, which are formed to include at least one selected from PE, PS, and PP, may experience transformations such as contraction due to heat that is applied to melt the first layer 132.

Accordingly, when the first layer 132 is formed with a material having a melting point ranging from about 60° C. to about 100° C., the first layer 132 and the separators 125 may be thermally bonded without damage of (e.g., damage to/from) the separators 125, and the first layer 132 is not melted even in the operations of the secondary battery 100, and thus stability of the secondary battery 100 may be secured. The first layer 132 may be formed with an alpha olefin copolymer. For example, the first layer 132 may be formed with an ethylene-alpha olefin copolymer or a propylene-alpha olefin copolymer.

The first layer 132 may be formed in a thickness of about 1 μm to about 50 μm. When the first layer 132 is thinner than 1 μm, the strength of attachment to the separators 125 by thermal bonding may decline. When the first layer 132 is thicker than 50 μm, the first layer 132 is difficult to sufficiently melt and an inner space of the can 110 decreases (e.g., relatively decreases), and therefore capacity of the secondary battery 100 may decrease.

The second layer 134 may be formed with a material that has a higher melting point than the first layer 132 so that the second layer 134 may maintain a shape thereof even in time of heating to melt of the first layer 132. Also, the second layer 134 supports the electrode assembly 120, and therefore may be formed with the material that has sufficient stiffness. While the second layer 134, for example, may be formed with polypropylene, the material of the second layer 134 is not limited thereto, and any other suitable material may be utilized.

The second layer 134 may be formed in a thickness of about 1 μm to about 100 μm. When the second layer 134 is thinner than 1 μm, it is difficult for the second layer 134 to have enough stiffness to prevent the pushing-away phenomenon in the electrode assembly 120 and the like. On the contrary, when the second layer 134 is thicker than 100 μm, the capacity of the secondary battery 100 may decrease.

Meanwhile, the protection film 130 may further include opening (e.g., holes) 136. The electrolyte injected into the can 110 may move in a direction of the electrode assembly 120, and thus the electrode assembly 120 may be impregnated with the electrolyte. For example, the electrolyte may move to an inside of the electrode assembly 120 through gaps between the first electrode plates 121 and the separators 125 and between the separators 125 and the second electrode plates 123, which is caused by capillary action. Accordingly, the openings (e.g., holes) 136 may be distributed uniformly in the protection film 130. Also, the openings 136 may be formed in a size of equal to or less than 30 μm. Here, the size of the openings 136 refers to either a parameter of (e.g., diameter of) the openings 136 when the openings 136 are circles, or a maximum opening length of the openings 136 when the openings 136 have shapes other than circles.

Likewise, when the protection film 130 is coupled to (e.g., attached to or stuck to) the one end of the electrode assembly 120, an inner short-circuit of the secondary battery 100 may be prevented. Also, the separators 125 are fixed by the first layer 132, and therefore, the location of the electrode assembly 120 is fixed. Thus, the electrode assembly 120 may be prevented or protected from moving (e.g., experiencing motions) within the can 110.

Figure 5:
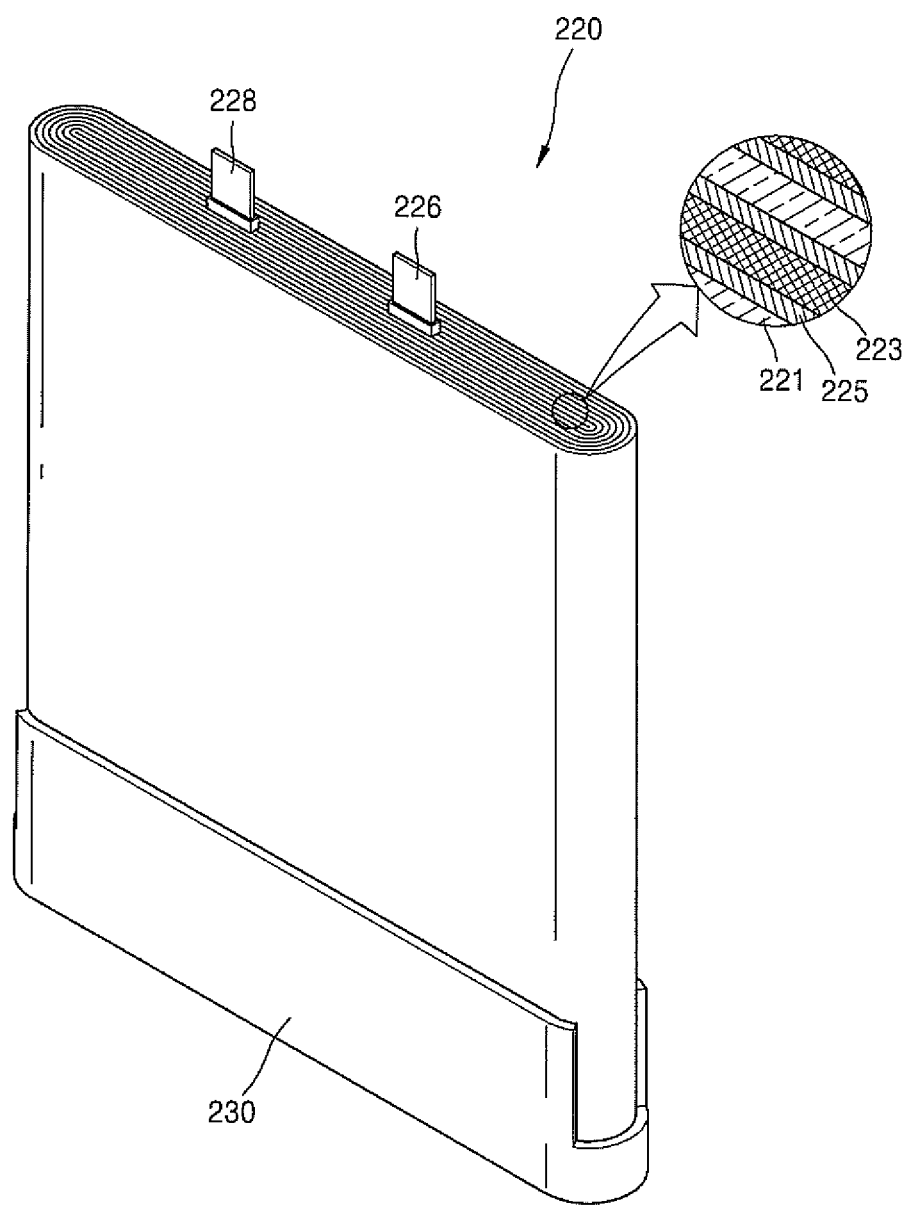
FIG. 5 is a perspective view that schematically illustrates a modified example of the electrode assembly of the secondary battery of FIG. 1, according to an example embodiment of the present invention.

FIG. 5 is a perspective view that schematically illustrates a further example of the electrode assembly of the second battery of FIG. 1, according to an example embodiment of the present invention.

Referring to FIG. 5, an electrode assembly 220 may include first electrode plates 221, second electrode plates 223, separators 225 between the first electrode plates 221 and the second electrode plates 223, which are rolled together, and a first electrode tab 226 and a second electrode tab 228, which may be electrically coupled to (e.g., electrically connected to) each other (e.g., the first electrode tab 226 and the second electrode tab 228 may be coupled to the first electrode plates 221 and the second electrode plates 223, respectively). Also, a protection film 230 may be coupled to (e.g., stuck to or attached to) one end of the electrode assembly 220.

The separators 225 are formed with a larger area than the first electrode plates 221 and the second electrode plates 223 to prevent a short-circuit between the first electrode plates 221 and the second electrode plates 223, and therefore the separators 225 may protrude more toward the protection film 230 than the first electrode plates 221 and the second electrode plates 223 at the one end of the electrode assembly 220 to which the protection film 230 is coupled (e.g., stuck or attached).

Accordingly, the protection film 230 is separated from the first electrode plates 221 and the second electrode plates 223 and may be attached to an end portion of the separators 225 by thermal bonding. The protection film 230 has a lower melting point than the separators 225, and may include a first layer, which is thermally bonded to the separators 225, and a second layer, which is formed with a different material from the first layer. The first layer and the second layer are substantially the same as (e.g., the same as) the first layer 132 and the second layer 134 respectively, which are explained in FIGS. 1 through 4, and therefore the repeated descriptions thereof may not be provided.

The protection film 230 may be formed with at least one side thereof extended so as to cover (e.g., be stuck to) a portion of sides of the electrode assembly 220. The electrode assembly 220 may be formed with the first electrode plates 221, the separators 225, and the second electrode plates 223 rolled together, in which the separators 225 may be located at an outermost side of the electrode assembly 220 for insulation. Here, when the protection film 230 covers (e.g., is stuck up to) the sides of the electrode assembly 220, the separators 225 located at the outermost side of the electrode assembly 220 may be prevented from unwinding, and the state in which the electrode assembly 220 is rolled may be maintained. Accordingly, although an inner temperature of a secondary battery is raised by heat generated in operations of the secondary battery, the unwinding of the electrode assembly 220 may be prevented.

As described above, according to one or more embodiments of the present invention, a short circuit between an electrode assembly and a can may be effectively prevented, and therefore stability of a secondary battery may be improved (e.g., secured).

Besides, effects of the present invention may be derived from the above explanation with reference to the accompanying drawings.

While example embodiments of the present invention have been described with reference to the figures, the present invention should not be construed as limited to the example embodiments described above, and it will be understood by those of ordinary skill in the art that various changes in form and details may be made therein without departing from the spirit and scope of the present invention as defined by the following claims, and equivalents thereof.

What is claimed is:

1. A secondary battery comprising:
an electrode assembly comprising a first electrode plate, a second electrode plate, and a separator between the first electrode plate and the second electrode plate;
a protection film coupled to a first end of the electrode assembly;
a can accommodating the electrode assembly; and
a cap plate coupled to the can at a second end of the electrode assembly opposite from the first end,
wherein the separator protrudes more toward the protection film than the first electrode plate and the second electrode plate at the first end of the electrode assembly,
wherein the protection film is thermally bonded to an end portion of the separator and the first electrode plate and the second electrode plate are entirely separated from the protection film,
wherein the protection film comprises a first layer thermally bonded to the end portion of the separator, and a second layer stacked on the first layer,
wherein the end portion of the separator is embedded in the first layer, and
wherein a melting point of the first layer is lower than that of the separator.

2. The secondary battery of claim 1,
wherein the first layer and the second layer comprise a different material from each other.

3. The secondary battery of claim 2, wherein the melting point of the first layer is lower than that of the second layer.

4. The secondary battery of claim 3, wherein the first layer comprises an ethylene-alpha olefin copolymer and/or a propylene-alpha olefin copolymer.

5. The secondary battery of claim 4, wherein a thickness of the first layer ranges from about 1 μm to about 50 μm.

6. The secondary battery of claim 3, wherein the second layer comprises polypropylene.

7. The secondary battery of claim 6, wherein a thickness of the second layer ranges from about 1 μm to about 100 μm.

8. The secondary battery of claim 1, wherein the protection film has a plurality of openings.

9. The secondary battery of claim 1, wherein the protection film is coupled to a portion of a side of the electrode assembly.

10. A secondary battery comprising:
an electrode assembly in a jelly-roll shape and comprising a first electrode plate, a second electrode plate, and a separator between and rolled together with the first electrode plate and the second electrode plate;

a protection film coupled to a lower surface of the electrode assembly; and a cap plate coupled to a top surface of the electrode assembly opposite from the lower surface, wherein the separator protrudes more toward the protection film than the first electrode plate and the second electrode plate at the lower surface of the electrode assembly, wherein the protection film comprises a first layer thermally bonded to an end portion of the separator and a second layer, the second layer being stacked on the first layer, wherein the first electrode plate and the second electrode plate are entirely separated from the protection film, wherein the end portion of the separator is embedded in the first layer, and wherein a melting point of the first layer is lower than that of the separator.

11. The secondary battery of claim 10, wherein the first layer and the second layer comprise a different material from each other, and wherein the melting point of the first layer is lower than that of the second layer.

12. The secondary battery of claim 11, wherein the melting point of the first layer ranges from about 60° C. to about 100° C.

13. The secondary battery of claim 11, wherein the first layer comprises an ethylene-alpha olefin copolymer and/or a propylene-alpha olefin copolymer.

14. The secondary battery of claim 13, wherein a thickness of the first layer ranges from about 1 μm to about 50 μm.

15. The secondary battery of claim 11, wherein the second layer comprises polypropylene.

16. The secondary battery of claim 15, wherein a thickness of the second layer ranges from about 1 μm to about 100 μm.

17. The secondary battery of claim 10, wherein the protection film has a plurality of openings, and each of the openings is equal to or less than 30 μm, in size.

18. The secondary battery of claim 10, wherein the protection film is coupled to a portion of a side of the electrode assembly.

19. The secondary battery of claim 10, further comprising a can accommodating the electrode assembly and the cap plate coupled to the can.

* * * * *